US008187645B2

(12) United States Patent
O'Sullivan et al.

(10) Patent No.: US 8,187,645 B2
(45) Date of Patent: May 29, 2012

(54) YOGURT CONTAINING CONFECTIONERY PIECES

(75) Inventors: Heidi O'Sullivan, Plymouth, MN (US); Jennifer M. Maack, Alexandria, MN (US); Leslie D. Miller, Mendota, IL (US); Joana Montenegro, Prior Lake, MN (US); Lisa K. Pannell, St. Louis Park, MN (US); Richard A. Thompson, Champlin, MN (US)

(73) Assignee: General Mills, Inc., Minneapolis, MN (US)

( * ) Notice: Subject to any disclaimer, the term of this patent is extended or adjusted under 35 U.S.C. 154(b) by 1627 days.

(21) Appl. No.: 11/388,857

(22) Filed: Mar. 24, 2006

(65) Prior Publication Data

US 2006/0165844 A1 Jul. 27, 2006

Related U.S. Application Data

(62) Division of application No. 10/197,932, filed on Jul. 17, 2002, now Pat. No. 7,037,538.

(51) Int. Cl.
*A23C 9/12* (2006.01)

(52) U.S. Cl. .............. 426/34; 426/42; 426/43; 426/580; 426/583; 426/584; 426/585

(58) Field of Classification Search ............... 426/34, 426/42, 43, 580, 583, 584, 585
See application file for complete search history.

(56) References Cited

U.S. PATENT DOCUMENTS

| | | | |
|---|---|---|---|
| 5,820,903 | A | 10/1998 | Fluery et al. |
| 5,820,913 | A | 10/1998 | Grassler et al. |
| 6,063,419 | A | 5/2000 | Roche et al. |
| 6,068,865 | A | 5/2000 | Lee et al. |
| 6,235,320 | B1 | 5/2001 | Daravingas et al. |

FOREIGN PATENT DOCUMENTS

| | | |
|---|---|---|
| DE | 10121813 A | 11/2001 |
| EP | 0781510 A | 7/1997 |
| RU | 2088102 C1 | 8/1997 |

*Primary Examiner* — Leslie Wong
(74) *Attorney, Agent, or Firm* — Dale A. Bjorkman; Annette M. Frawley

(57) ABSTRACT

Methods of preparation for cultured milk based products and products prepared thereby are provided wherein a yogurt is produced containing 0.1% to about 5% confectionery filaments. The process involves providing a cooled fermented yogurt base at a temperature of 0° C. to 5° C.; injecting a liquid fat-bearing compound having a total fat concentration of 24% to about 40% into the cooled yogurt base; whereby the liquid fat-bearing compound is shattered into filaments upon contact with the cooled fermented yogurt.

17 Claims, 1 Drawing Sheet

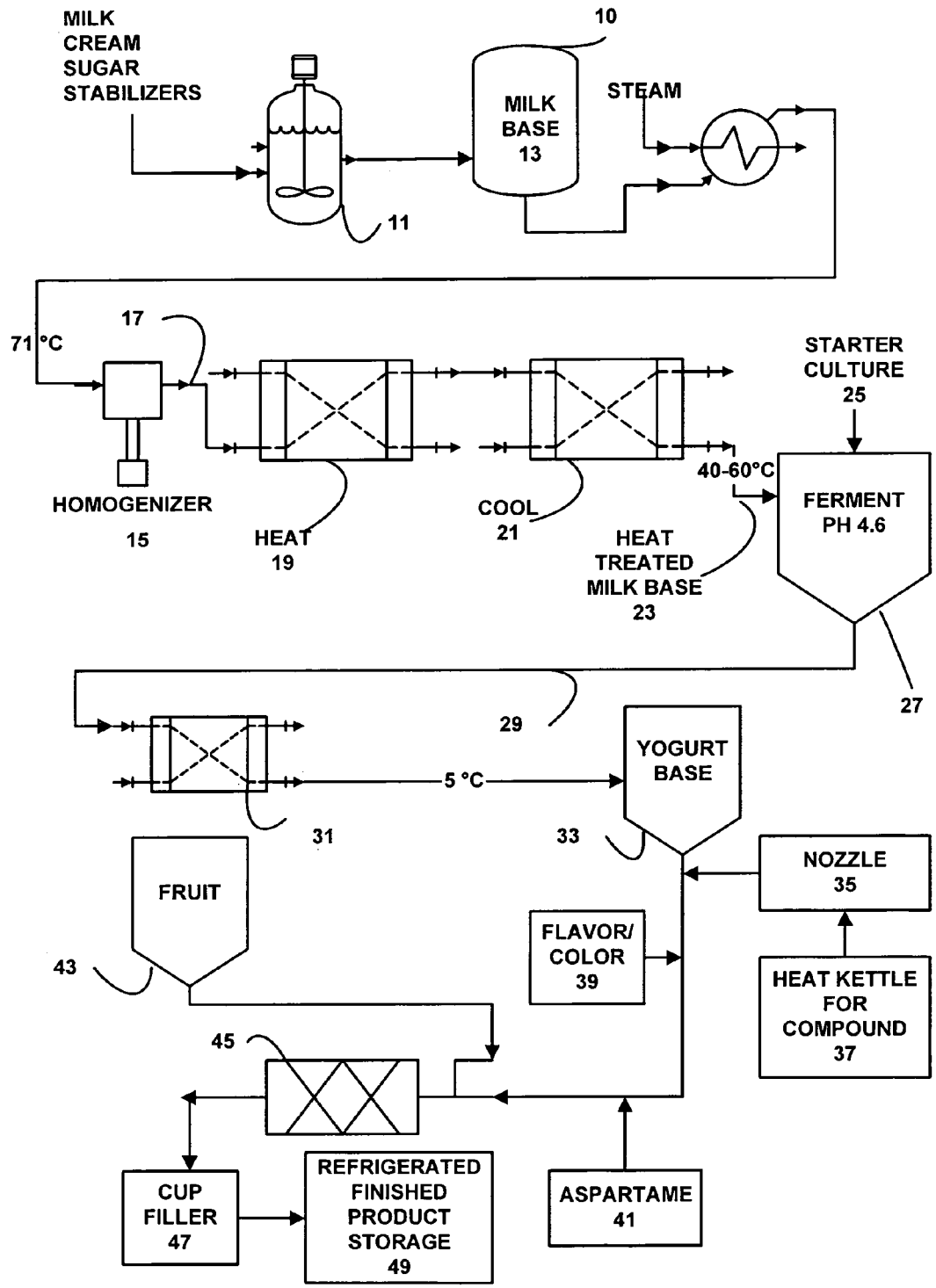

YOGURT CONTAINING CONFECTIONERY PIECES

CROSS-REFERENCE TO RELATED APPLICATION

The present application is a divisional of U.S. patent application Ser. No. 10/197,932 filed Jul. 17, 2002, now U.S. Pat. No. 7,037,538, the entire disclosure of which is incorporated herein by reference.

BACKGROUND OF THE INVENTION

The present invention relates to food products and their methods of preparation. More particularly the present invention relates to a method for the addition of chocolate pieces or other confectionery pieces in cultured milk based products and products prepared thereby. More particularly, the invention provides methods of preparing stirred style yogurt products containing chocolate pieces and other confectionery pieces dispersible within the yogurt.

Yogurt has continued to increase in popularity. Consumer appeal has expanded its use from plain, flavored, and fruit-filled yogurt consumed for health purposes, to consumption of yogurt as a satisfying dessert.

The present invention satisfies the consumer desire to have both a healthful product and a product with a dessert appeal. Furthermore, the present invention is found appealing to old and young alike.

There have been many attempts to produce a chocolate yogurt with consumer appeal. These efforts have been hampered as a result of the characteristic tartness of yogurt having an undesirable flavor impact on chocolate. Typically highly acidic products, such as yogurt that has a pH of less than 4.6, negatively impact consumer acceptability when consumed with flavors that are delivered via a neutral or alkaline media (e.g., chocolate, caramel, dulche de leche).

A variety of yogurt-type products containing chocolate have been produced that attempt to please the consumer palate while providing a healthful, desirable dessert. For example, a number of commercial chocolate yogurt products employ a compartmentalized package containing a yogurt in one compartment and a chocolate syrup, chocolate pudding, or chocolate powder in another as disclosed in U.S. Pat. No. 6,068,865, Lee, et al., "Chocolate yogurt and preparation". The yogurt and chocolate components are blended just prior to consumption.

Other commercial products have a high starch and sugar content to address the tart flavor associated with yogurt, the products however have been heat treated to sterilize the chocolate and yogurt thus killing the live and active cultures.

The present invention comprises a yogurt containing live and active cultures with confectionery pieces dispersed within the yogurt. The consumer finds appeal in the present invention anticipating a tart flavored yogurt with bits of a sweet chocolate dispersed therein.

Chocolate and other confectionery pieces have been dispersed within other dairy based products (e.g. ice cream) for a number of years. Dispersion of confectionery pieces in ice cream has been easily accomplished due to the products frozen state; additionally the ice cream has a sweet taste and a pH more compatible with alkaline and neutral pH flavors such as chocolate. As illustrative, Publication No. RU 2088102 C1, Rudenko et al. entitled "Ice Cream and Method of Preparing Same" provides a method for the addition of irregular-shaped chocolate flakes in ice cream. The method involves preparing a mixture of ice cream components, freezing the mixture to $-8°$ C. to $-9°$ C. with simultaneous addition of liquid chocolate to the mixture, mixing the components and whipping for 2 to 6 minutes to form chocolate flakes. The chocolate is at a temperature of $56°$ C. to $60°$ C. when it is added to the mixture in an amount of 6.5% to 8.5% by mass of the finished product.

In another dairy based example, U.S. Pat. No. 5,820,913, Grassler, et al. entitled "Preparation of mousse containing sterilized chocolate pieces" a composite product of a milk-based mousse and chocolate product pieces is disclosed. In the example, a chocolate product of a fat, cocoa butter and sugar in amounts, by weight, of from 50% to 70% fat, of from 30% to 50% cocoa powder and of from 1% to 10% sugar, is sterilized and a milk-based mixture, which is suitable for being overrun and preparing a mousse, also is sterilized, the sterilized mixture is overrun to obtain the mousse, and the sterilized chocolate product is delivered to and combined with the mousse so that the mousse contains pieces of the sterilized chocolate product therein, such that the pieces are in an amount of between 2% and 10% by weight, the composite product so obtained is introduced into containers refrigerated.

BRIEF SUMMARY OF THE INVENTION

Yogurt is a nutritious popular dairy product. At retail, yogurt is now available in a wide assortment of varieties of texture, fat content, sweetener type and level, and flavor among other attributes. Other than aseptically packaged yogurt, yogurt is traditionally distributed and consumed with a live culture that requires refrigerated distribution ($2°$ C. to $10°$ C.).

As can be appreciated from the numerous styles and flavors within styles of yogurts, product proliferation and differentiation is an important characteristic of commercial yogurt manufacture. In this highly competitive food product category, there is a continuing desire to develop novel products having distinctive visual, taste, and textural variations in order to stimulate interest in yogurt sales.

In its method aspect, the present invention resides in the addition of a liquid stream of a fat based compound to the yogurt base, the liquid stream forms solid particulates upon contact with the cold yogurt base. The solid particulates can be dispersed within the yogurt base upon further intermixing.

The present methods essentially comprise the step of discharging a liquid chocolate into a cooled fermented stirred style dairy base whereby the liquid chocolate is shattered into filament particulates upon contact with the cooled fermented dairy base In its product aspect, the present invention resides in refrigerated stirred style yogurts having live cultures at acidic pH that essentially comprise randomly shaped and sized discrete pieces of sweetened chocolate evenly dispersed there through. The yogurt products comprise about 0.1% to about 5% by weight of these chocolate pieces. The pieces have a mean particle size of about 1 mm to about 5 mm pieces generally of about 2 to 5 g.

Preferably, the chocolate pieces can be characterized as elongated cut filaments having an average aspect ratio of at least 2:1 of length to largest thickness. The elongated cut filaments can further be characterized as having an average aspect ratio ranging from 2:1 to about 4.5:1 of length to largest thickness.

The elongated chocolate filaments have a higher ratio of surface area to weight than more spherical chocolate particulates or chips. Surprisingly, notwithstanding the greater surface area the elongated filaments exhibit good resistance to deformation over the sixty (60) day storage period for commercial products.

Furthermore, yogurt products characterized as having a viscosity of 15,000 cps. to 90,000 cps. surprisingly exhibit a reduced tendency for the elongated filaments to segregate from uniform dispersion over time and settle to the bottom of a yogurt container. While not wishing to bound by the proposed theory, it is believed that the larger surface area of the elongated filament pieces contribute to maintaining even distribution of the filaments throughout the yogurt product over the conventional storage time periods.

BRIEF DESCRIPTION OF THE DRAWINGS

FIG. 1 is a schematic process flow diagram illustrating the method of preparation of the present invention.

DETAILED DESCRIPTION OF THE INVENTION

The present invention relates to a method of preparation for cultured milk based products, more particularly yogurt products containing chocolate filaments or other fatbearing filaments. The preparation steps as well as product components, product use and attributes are described in detail below.

From a yogurt manufacturing process standpoint, all yogurts fall into one of two styles; namely, 1) set yogurts, and 2) stirred style. The present invention finds particular suitability for use in connection with the provision of stirred style yogurts. Within these broad two classifications, numerous yogurt varieties exist.

In the set style, the manufacturer fills cups or containers with an inoculated but unfermented milk base and quiescently holds the filled cups at warm temperatures (≈40° C. to 50° C.) to allow the yogurt to ferment therein. After the desired fermenting or maturing time, the product is cooled which arrests the culturing activity and also allows the body to set to form the gel-type texture. Set style yogurts have a relatively low initial viscosity (i.e., upon filling of its food package container) and a higher temperature ("temperature of filling") compared to the viscosity of stirred style yogurt products. As the product ferments and then is cooled, its viscosity increases to its final viscosity value. A set style yogurt is characterized by a more firm, gel-like consistency and higher final viscosity than many stirred style yogurts. In addition to the natural thickening effect of the yogurt culture, a wide variety of thickeners and stabilizers are taught as useful to supplement the yogurt's gel characteristics.

Of course, within this set style, there is a continuum of body firmness. Most set custard style products have quite firm gels although some others are much softer. One variety of a set style yogurt is a "custard" style yogurt. The softer gel products may even be perceived by the consumer as being thinner than even certain stirred style products.

In the second general category of yogurt products, the yogurt is of a stirred type. In producing stirred yogurt products, the manufacturer 1) ferments an inoculated milk base in bulk, e.g., in large stirred fermentation or culturing tanks, 2) cools the yogurt so formed to arrest the fermentation, and then 3) fills the individual yogurt container with thickened yogurt. Such production facilities are run in a continuous or semi-continuous manner. More specifically, after fermentation to desired acidity and thickness, the yogurt is pumped through cooling heat exchangers to arrest the fermentation. The cooling also typically results in an increase in the viscosity of the yogurt. Flavorings and sweeteners can be admixed with the cooled yogurt and the yogurt is charged to containers. Conventionally, care needs to be taken to minimize the shear imparted to the yogurt in practicing such process steps to minimize the loss of thickness or viscosity built up by the fermentation step as augmented by cooling. Thus, the stirred style yogurt typically has a higher viscosity than set style yogurts upon filling due to the lower temperature and the thickening affect of yogurt culture. Nonetheless, the stirred style yogurt typically builds or increases substantially in viscosity after filling over time until reaching its intended finish viscosity. Of course, stirred yogurts also come in various styles and product variations.

Most commonly, fruit preserves or purees are stirred into the stirred yogurt immediately prior to filling. Such stirred style yogurts comprising intermixed fruit purees are sometimes referred to most frequently as "Swiss" style or, less frequently but equivalently as "Continental" or "French" style. Occasionally, stirred Swiss style yogurts are formulated with excessive amounts of stabilizers with the result that after refrigerated storage for 48 hours, the yogurt possesses a solid-like consistency, somewhat reminiscent of custard style yogurt.

The present invention finds particular suitability for use in connection with the provision of stirred style yogurts. A good description of preparing a fermented stirred yogurt is contained in commonly assigned U.S. Pat. No. 5,820,903 entitled "Calcium Fortified Yogurt and Methods of Preparation" (issued Oct. 13, 1998 to Fleury et al.) which is incorporated herein by reference. A good description of preparing an ultra-thick fermented stirred style yogurt is contained in commonly assigned U.S. application Ser. No. 10/147,246 entitled "Yogurt Production Process and Products" (filed May 13, 2001 to Cote et al.) which is incorporated herein by reference.

A natural consequence of the culturing process is the development of a sour or tart taste due to the production of lactic acid. The acid has several benefits, including providing a clean, fresh taste and aiding preservation. If the yogurt is made with good manufacturing practices and cultured until the pH is less than about 4.6, the product should be stable for several weeks under refrigeration.

However, as mentioned the acid flavor is incompatible with some flavors such as chocolate. Attempts to reduce the acid flavor by the use of buffering salts is not effective because the salts tend to increase the pH to an extent that preservation of the yogurt cannot be assured. Additionally, the buffering tends to add an off flavor, incompatible with both yogurt and chocolate. Likewise, heating the yogurt to assure stability kills the active cultures, making the product less desirable to many consumers.

Referring now to the drawing, it can be seen that in the present methods generally designated by reference numeral 10, the first essential step is to provide a warm fermented dairy base such as a yogurt. Conventional methods and techniques can be used to practice this step.

Conveniently, this first step can include the sub steps of (1) providing a milk base 13, (2) homogenizing the milk base 15, (3) pasteurizing the homogenized milk base 19, (4) bringing the pasteurized milk base to fermenting temperatures 21 such as by cooling, (5) adding a starter culture 25, and (6) fermenting to desired acidities 27.

Briefly, the process typically begins with raw milk, that may contain a combination of whole milk, skim milk, condensed milk, dry milk (dry milk solids non-fat or, equivalently, "MSNF"), grade A whey, cream and/or such other milk fraction ingredients as buttermilk, whey, lactose, lactalbumins, lactoglobulins, or whey modified by partial or complete removal of lactose and/or minerals, other dairy ingredients to increase the nonfat solids content, which are blended to provide the desired fat and solids content. While not preferred, the milk base can include a filled milk component, i.e., a milk ingredient having a portion supplied by a non-milk ingredient, e.g., oil or soybean milk.

While in the present invention, particular emphasis is directed towards fermented bovine milk products such as yogurt, the skilled artisan will appreciate that the present invention is also suitable for use in a wide variety of thickened refrigerated dairy products, particularly acidic especially fermented dairy products such as kefir, sour cream and the like.

Also, while bovine milk is preferred, other milks can be used in substitution for bovine milk whether in whole or in part, e.g., goat, sheep or equine milk. In less preferred embodiments, all or a portion of the fluid milk can be substituted with an equivalent amount of soybean milk or nut milks, e.g., coconut milk.

The milk base 13 can further include sweeteners. For example, the milk base can optionally further comprise a nutritive carbohydrate sweetening agent(s). Exemplary useful nutritive carbohydrate sweetening agents include, but are not limited to, sucrose, high fructose corn syrup, dextrose, various DE (Dextrose Equivalent) corn syrups, beet or cane sugar, invert sugar (in paste or syrup form), brown sugar, refiner's syrup, molasses (other than blackstrap), fructose, fructose syrup, maltose, maltose syrup, dried maltose syrup, malt extract, dried malt extract, malt syrup, dried malt syrup, honey, maple sugar, except table syrup, concentrated fruit juice and mixtures thereof.

Conveniently, the raw milk and sweeteners (such as fructose, corn syrup, sucrose) can be blended in a first mix tank 11. Minor ingredients such as stabilizers and thickeners such as starch, gelatin, pectin, agar, carrageenan and mixtures thereof can also be added if desired. The minor ingredients are combined with the sweetened milk to form the milk base 13.

Next, the milk base 13 is homogenized 15 in a conventional homogenizer to disperse evenly the added materials and the fat component supplied by various ingredients thereby forming a homogenized milk base. If desired, the milk base 13 can be warmed prior to homogenization from typical milk storage temperatures of about 5° C. to temperatures of about 65° C. to 75° C.

This homogenized milk base is then pasteurized 19, typically by heating for times and temperatures effective to accomplish pasteurization to form a pasteurized milk base. As is well known, the milk base 13 can be heated to lower temperatures for extended time, e.g., 88° C. for 30 minutes, or alternately to higher temperatures, e.g., 95° C., for shorter times, e.g., for about 38 seconds. Of course, intermediate temperatures for intermediate times can also be employed. Other pasteurization techniques can be practiced (e.g., light pulse, ultra high pressure, etc.) if effective and economical. In certain commercial practices, the sequence of the homogenization and pasteurization steps can be reversed.

The homogenized and pasteurized base is then brought to incubation temperature, usually about 40° C. to 46° C. When heat pasteurization is employed, this step typically is a cooling step 21.

Thereafter, the homogenized and pasteurized milk blend is inoculated with a desired culture 25 and fermented 27 to desired fermentation endpoints to form a yogurt or yogurt base. Usually, a combination of *Lactobacillus bulgaricus* and *Streptocuccus thermophilus* bacteria is added to begin the fermentation process. In other variations, the yogurt culture can additionally include a *Lactbacillus bifidus* and/or a *Lactbacillus acidophilus* bacteria. The fermentation step 27, is quiescently continued until the pH of the milk blend reaches approximately 4.4 to 4.6 endpoint to form a fermented dairy or yogurt base. Depending upon temperature and amount of culture added, this may take from about three to about 14 hours. It is important that the mixture not be agitated or minimally agitated during the fermentation process to allow proper curd formation.

The particular fermentation endpoint pH can vary modestly. Typically, the endpoint can range from about 4.2 to 4.6, preferably about 4.45 to 4.55.

The yogurt base thus prepared is characterized by a viscosity of at least 15,000 cps. preferably at least 18,000 cps. (at 40° C. to 60° C.). Yogurt viscosities can range up to 20,000 cps. at this stage. The yogurt base can further be characterized as having a total solids content of 27% to 33% by weight.

The present methods essentially comprise the step of thereafter cooling the yogurt 31 (e.g., to about 0° C. to 21° C.) to arrest further growth and any further drop in the pH. In a preferred variation, the cooling step is performed rapidly, e.g., by passing through a heat exchanger having an average residence time of about 10 to 100 seconds.

Thereafter, the present methods further essentially comprise a characterizing step of rapidly adding a liquid or molten cocoa butter bearing chocolate stream having a temperature of at least above its melting point or 32° C., preferably 43° C. such as by injecting into the cold yogurt stream. A commercially sterile chocolate product can be shipped to the production facility in a solid mass and heated as convenient to temperatures above the melting point of the fat to fluidity to form a molten chocolate. As used herein, the term "chocolate product" refers to a compound having a total fat content of about 24% to about 45% by weight. Other ingredients in the chocolate product include sugar and chocolate. Thus, the liquid or molten chocolate is to be distinguished from chocolate liquid syrups that are essentially fat free that are also liquid at the present addition temperatures that do not solidify upon cooling to refrigerated temperatures.

Cocoa butter is the primary fat source found in chocolate, and is defined as the edible fat obtained from cocoa beans. Cocoa butter exhibits a sharp melting point at 37° C. with a softening of the cocoa butter around 32° C. The melt profile of the cocoa butter provides the primary functional role of fat in chocolate, the "melt in the mouth" textural properties. Cocoa butter also contracts upon solidification that allows molding and shaping of chocolate.

The cocoa butter in a traditional chocolate compound serves several functions. First, it provides the sensory benefits of a creamy mouthfeel due to the fact that cocoa butter melts sharply at 37° C. The fat also carries flavor and allows this flavor to dwell on the taste buds, thereby enhancing the chocolate sensation. In addition to the sensory benefits of fat in chocolate, the fat serves several functional roles in the chocolate compound. The fat binds the cocoa and sugar together to form a paste. The cocoa butter functions as an ingredient binder, a structural agent, a flavor carrier, and a textural and mouthfeel agent.

The chocolate product can be sweet or semi-sweet. One type of chocolate product has a fat concentration of about 33% and most typically about 37% to 38% by weight. The product can be dark chocolate or of milk chocolate, i.e. additionally containing milk solids. "Pure chocolate" product is preferred, i.e., those containing only cocoa butter. Less preferred are chips of similar appearance but wherein a portion of the fat is replaced with substitute fats for cocoa butter.

In less preferred yet nonetheless operable embodiments of the invention herein, flavor fat-bearing compounds can be selected for use in full or partial substitution for the preferred chocolate products. These flavored fats can be heated to above the melting point of their respective fat constituents and can then be dispersed within the cold yogurt stream in like manner to form filaments of flavor fat dispersed throughout the chilled stirred yogurt base to form filament bearing yogurts. The flavor fat compounds can have a fat concentration of about 24% to 30% by weight, preferably 27% to about 28% by weight. Flavor fat-bearing compound flavors can include butterscotch, strawberry, banana, vanilla, orange, peanut butter, and other berry flavors. The flavor fat compounds can optionally be colored too. Of course, blends of flavors are contemplated herein. In still other variations, the fat compounds can be characterized as having minimal characterizing flavor but can be formulated to comprise colors. The preferred melting profile of confectionery fats is a very sharp melt just below body temperature with a relatively high solids concentration just below 37° C. to mimic the melting profile of chocolate. A useful exemplary chocolate or flavor fat compounds are commercially available from, for example, Wilbur Chocolate having an address of 20 North Broad Street, Litiz, Pa. USA 17543.

The chocolate or flavor fat compound can be placed in a warm room having a temperature of about 32° C. to about 45° C. to convert the compound from a solid to a liquid state, thus forming a molten or liquid chocolate stream or a liquid flavor fat compound stream.

Thereafter, the stream can be transferred via a pump, such as a positive displacement pump Model No. 6 manufactured by Waukesha-Burrell, purchased from Fluid Solutions having an address of P.O. Box 296, Marshfield, Wis. 54449. The pump can be water-jacketed, such that water can flow through the jacket at a constant temperature of about 29° C. to about 48° C. The water jacket can assist in maintaining the liquid state of the stream.

The chocolate and flavor fat compound streams can be injected into the cold yogurt base. Upon contact with the cold yogurt base the streams shatter and solidify into particulates especially filaments ranging in size from 1 mm to about 5 mm in longest dimension, preferably about 2 mm. The size of the particulates is dependent on several factors including the orifice size and type of the injection nozzle, the temperature of the cold yogurt base, the temperature of the liquid chocolate or liquid fat-bearing compound, and the pressure of the liquid stream. For example, a chocolate stream having a temperature of 32° C. injected into the yogurt base will produce larger chocolate filaments than a chocolate stream injected into the yogurt base having a temperature of 43° C.

The filaments can further be characterized as having cylindrical faces, but in the preferred embodiment have opposed major faces in the form of strips.

Preferably, the yogurt base temperature is maintained below 7° C., more preferably below 3° C. If the yogurt base achieves a temperature above 7° C. during the process, the product must be placed on hold to ensure microbial issues have not developed. Additionally, if the yogurt base achieves a temperature at or above 3° C. the chocolate stream does not shatter cleanly into filaments upon injection into the yogurt base, but rather will undesirably form a stringy material having an aspect ratio in excess of the preferred upper value.

In preferred variations, the nozzle can be of a pencil jet type with an orifice diameter of 1-2 mm to add the molten chocolate. In more preferred form, the pencil jet is oriented to add the liquid molten chocolate at about a right angle (±15°) to a passing stream of chilled yogurt base to facilitate break up of the chocolate into the desirably sized and shaped pieces.

The molten chocolate can be injected into the cold yogurt base via pulsing at up to 100 cycles per second, preferably the molten chocolate can be injected via non-pulsing.

The finished yogurt product can desirably contain particulates or bits within a clean yogurt base, in contrast to a yogurt discolored as a result of the chocolate stream forming a stringy chocolate compound within the yogurt base or even dissolving therein to form a brown hued yogurt base. Preferably the yogurt product with particulates contains about 1% to about 5% by weight chocolate particulates, more preferably 1% to about 1.5% by weight chocolate particulates. Greater than 5% by weight chocolate compound injected into the yogurt base can cause the yogurt base to attain temperatures greater than 7° C., resulting in appearance, microbial, taste and texture issues. As illustrated in FIG. 1, in preferred variations, the present methods of preparation can further optionally comprise after formation a blending or gentle mixing step to evenly distribute the filaments once formed throughout the yogurt base. In preferred form, an in-line static mixer 45 can be used to practice this step of evenly distributing the chocolate pieces in the yogurt base.

In certain embodiments, particularly low fat and/or low calorie variations, the yogurt product herein comprises a high potency non-nutritive carbohydrate sweetening agent. Exemplary high potency sweeteners include aspartame, sucrose, potassium acesulfame, saccharin, cyclamates, thaumatin and mixtures thereof. Especially preferred for use herein is aspartame.

If aspartame is employed, an aqueous dispersion 41 thereof can be prepared and added to the yogurt base. As illustrated in FIG. 1, an in-line static mixer 45 can be used to blend the slurry into the yogurt base with the liquid chocolate stream via a static mixer to minimize shear. Minimum shear is desirable to avoid degrading the yogurt base viscosity.

If desired, various flavors and colors 39 can be added with or in a manner similar to the aspartame dispersion or liquid chocolate stream. Illustrative flavors include vanilla, chocolate, amaretto cheesecake, white chocolate, Boston cream pie, caramel apple, banana cream pie, fruit flavors including orchard fruit and/or berry flavors, and mixtures thereof.

If desired, the yogurt can additionally include a conventional fruit sauce or puree. If present, the fruit constituent can comprise about 5 to 15% of the yogurt product. However, care must be taken to prevent an overbearing microbial load on the yogurt base with the combination of a fruit puree and chocolate stream. The present method thus can comprise the optional additional step of adding a fruit sauce or puree 43. In the manufacture of Swiss-style yogurt, fruit flavoring is blended substantially uniformly throughout the yogurt after fermentation is complete but prior to packaging 47. A static mixer 45 can be used to blend the fruit sauce into the yogurt with minimal shear.

In still other embodiments, the yogurt can be aerated to form an aerated or whipped yogurt such as is described in commonly assigned U.S. Ser. No. 09/966,849 entitled Whipped Yogurt Products And Method Of Preparation (Filed on Sep. 28, 2001 to Nair et. al.) which is incorporated herein by reference to form aerated yogurts characterized by densities of about 0.6 to 0.95 g/cc. While nitrogen or air is the preferred added gas, in less preferred embodiments the added gas can comprise $CO_2$ to form carbonated yogurt products.

The yogurt with chocolate filaments or fat-bearing filaments so prepared are preferably characterized by sufficient amounts of live and active yogurt cultures to provide an initial (i.e., at time of manufacture) culture count of at least $1.5 \times 10^8$ colony-forming units (cfu)/gram. The yogurt with chocolate filaments or fat-bearing filaments can be further characterized as having a culture activity demonstrating greater than 1 log increase in cfu/gram in a standard activity test comparing the yogurt culture count at time of manufacture versus the yogurt culture count at the end of the products shelf-life. Care thus must be taken to avoid further processing that reduces or destroys the viability of the desirable live and active culture such as further heat or pressure treatments intended to pasteurize or sterilize the product prior to refrigerated temperature distribution and sale.

In certain variations, variously flavored and/or colored portions can be layered to form parfait style products such as are described in commonly assigned U.S. Pat. No. 6,235,320 entitled Colored Multi-layered Yogurt and Methods of Preparation (issued May 22, 2001 to Daravingas et al.) which is incorporated herein by reference.

The yogurt with chocolate filaments or flavored fat-bearing filaments, with or without fruit is then charged to a conventional container such as a coated paper or plastic cup or tubes fabricated from flexible film packaging stock.

After filling, the filled containers are applied with a lid or other closure or seal, assembled into cases and entered into refrigerated storage for distribution and sale.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A nutritionally fortified cultured dairy product comprising:
   a. a first intermediate containing live and active cultures, having a culture count of at least $1.5 \times 10^8$ cfu/gram;
   b. a second intermediate having a fat concentration of about 24% to about 40% by weight, wherein the second intermediate comprises randomly shaped and sized discrete pieces in the form of filament particulates dispersed within the first intermediate.

2. The product of claim 1 wherein the second intermediate is at a lower concentration than the first intermediate.

3. The product of claim 1 wherein the first intermediate is a yogurt.

4. The product of claim 1 wherein the first intermediate is a yogurt having a viscosity of at least 75,000 cps. (at 5° C.).

5. The product of claim 1 wherein the first intermediate is a yogurt having a viscosity of at least 20,000 cps. (at 5° C.).

6. The product of claim 1 wherein the filament particulates are elongated pieces having an aspect ratio of 2:1 of length to largest thickness.

7. The product of claim 1 wherein the filament particulates are elongated pieces having an aspect ratio ranging from 2:1 to about 4.5:1 of length to largest thickness.

8. The product of claim 1 wherein the filament particulates have a mean particle size of about 2 mm to about 5 mm (longest dimension).

9. The product of claim 1 wherein the filament particulates comprise a chocolate compound.

10. The product of claim 1 wherein the filament particulates comprise a flavor chip.

11. The product of claim 10 wherein the flavor chips have flavors selected from the group consisting of banana, butterscotch, orange, peanut butter, strawberry, vanilla, raspberry, blueberry, black raspberry, blackberry, gooseberry, cranberry, logan berry and other berry flavors.

12. The product of claim 1 wherein the filament particulates have a fat concentration of about 24% to about 40% by weight.

13. The product of claim 1 wherein the filament particulates have a fat concentration of about 26% to about 28% by weight.

14. The product of claim 1 wherein the filament particulates have a fat concentration of about 35% to about 40% by weight.

15. The product of claim 1 wherein the second intermediate comprises 0.1% to 5% of the total weight.

16. The product of claim 1 wherein the second intermediate comprises 1% to 1.5% of the total weight.

17. The product of claim 1 wherein the filament particulates exhibit a melting profile having a very sharp melt just below 37° C. to mimic the melting profile of chocolate.

* * * * *